United States Patent [19]

Tsikos

[11] Patent Number: 4,507,557
[45] Date of Patent: Mar. 26, 1985

[54] NON-CONTACT X,Y DIGITIZER USING TWO DYNAMIC RAM IMAGERS

[75] Inventor: Constantine J. Tsikos, Pennsauken, N.J.

[73] Assignee: Siemens Corporate Research & Support, Inc., Iselin, N.J.

[21] Appl. No.: 468,104

[22] Filed: Apr. 1, 1983

[51] Int. Cl.$^3$ .......................... G01S 5/16; G01S 7/50
[52] U.S. Cl. ..................... 250/341; 250/221
[58] Field of Search .............. 250/341, 221; 340/365 P, 556, 555; 343/5 PD

[56] References Cited

U.S. PATENT DOCUMENTS

| | | | |
|---|---|---|---|
| 3,478,220 | 11/1969 | Milroy | 250/221 |
| 3,764,813 | 10/1973 | Clement et al. | 250/221 |
| 3,775,560 | 11/1973 | Ebeling et al. | 178/18 |
| 3,860,754 | 1/1975 | Johnson et al. | 178/18 |
| 4,107,522 | 8/1978 | Walter | 250/221 |
| 4,144,449 | 3/1979 | Funk et al. | 250/221 |

FOREIGN PATENT DOCUMENTS

1575420 9/1980 United Kingdom ................ 250/221

Primary Examiner—Alfred E. Smith
Assistant Examiner—Constantine Hannaher
Attorney, Agent, or Firm—Karl F. Milde, Jr.

[57] ABSTRACT

Apparatus is disclosed for detecting the position of an object within a viewing field, such as a CRT display screen. The apparatus includes point sources of radiation arranged at spaced locations around the edge of the viewing field and a retro-reflective surface disposed around the perimeter of the viewing field. The retro-reflective surface reflects radiation received from its originating source back toward this source. A radiation receiver is arranged adjacent to each source to receive the radiation reflected back from the retro-reflective surface and to determine the angular position of an object within the viewing field which interrupts the path of radiation.

21 Claims, 10 Drawing Figures

$X = X1 + \frac{1}{2}(X2 - X1)$

NON-CONTACT X,Y DIGITIZER USING TWO DYNAMIC RAM IMAGERS

BACKGROUND OF THE INVENTION

The present invention relates to apparatus for detecting the position of an object within a viewing field. One anticipated use of the present invention is to detect the existence and location of a pointing object, such as a finger or pencil, on a computer display screen, such as a CRT screen. Another anticipated use is to detect the presence of a person in a confined area, such as a room.

In general, position detecting apparatus known in the art senses the interruption of radiation, such as light, by an opaque object, such as a part of the human body. This apparatus utilizes radiation transmitters, which transmit radiation across the viewing field, parallel to the viewing field surface, and radiation receivers which detect the radiation passed across the viewing field and sense the existance and location of any interruption in this radiation (e.g. by an object).

One type of conventional apparatus for detecting the light interruption position, in an X—Y plane, of a small object, such as a human finger or a pencil, utilizes an X-coordinate array of multiple light sources mounted along one side of a rectangular display panel and paired with a corresponding X-coordinate array of multiple light detectors mounted on the opposite side of the panel. Also, similar Y-coordinate arrays of paired multiple light sources and detectors are respectively mounted along the remaining two opposite sides of the rectangular panel. Thus, the perimeter of the panel is covered by oppositely paired arrays of light sources and detectors. Examples of such apparatus are disclosed in U.S. Pat. Nos. 3,478,220; 3,764,813; 3,775,560 and 3,860,754.

This type of detection apparatus has certain inherent disadvantages. First, spatial resolution of the apparatus is no better than the limitation imposed by the number, size and spacing of the individual light sources and detectors, one from the next in the respective arrays thereof. Thus, in some commercial equipment of this type, it is possible for the human finger to be placed between two adjacent detectors and be missed by the parallel beams of light provided by the sources. Second, the apparatus utilizes a large number of active elements, i.e. light sources and detectors, not counting the circuitry, which are costly and have to be precisely mounted, in most cases, by manual labor. Therefore, the component cost and cost of manufacture and assembly are high. Third, the excessive number of light sources and detectors necessitates complex and costly arrangements of circuit components to operate the apparatus.

Another type of interruption position detection apparatus is disclosed in the U.S. Pat. No. 4,144,449. This type of detection apparatus is comprised of a generally rectangular frame having four sides and an open interior for the work area or viewing field. Lamps are provided on the frame for continuously emitting light through the interior of the frame from three sides thereof. A pair of linear image detector devices are respectively mounted on the frame at the two corners thereof located on opposite ends of the fourth side. Apertures are also located at each of the two frame corners and between the detector devices and a frame interior for configuring coincident fields of light therefrom for the detector devices to view. Each of the detector devices is capable of receiving a respective field of light from the frame interior and sensing interruption of light at any location within this field. According to the U.S. Pat. No. 4,144,449, this detector apparatus has the advantage over the previously described apparatus having paired arrays of light sources and detectors in that the number of components is greatly reduced while the resolution of the apparatus is increased. In addition, the overall complexity and cost of the circuitry required to operate the detection apparatus disclosed in the U.S. Pat. No. 4,144,449 is reduced in comparison with that of the apparatus having paired arrays of light sources and detectors.

Nevertheless, the detection apparatus disclosed in the U.S. Pat. No. 4,144,449 requires a relatively large frame as well as elongate light sources arranged on at least three sides of this frame. Thus, even this type of detection apparatus is large and cumbersome and is not readily adapted to be retro-fitted onto an existing display screen.

Furthermore, this known detection apparatus is limited in its application to relatively small viewing areas such as computer display screens. It is not readily adaptable for detecting the position of an object within a large viewing field such as a room in a building. Although it is theoretically possible to arrange a linear light source around the walls of a room, such light source would be extremely expensive, subject to accidental damage and would be aesthetically unappealing.

It would be desirable to provide apparatus of the above described type for use in detecting the positions of objects in large as well as in small viewing fields. In the large viewing field application, the detection apparatus would be useful, for example, in room surveillance and security as well as in connection with mechanical robots. For example, the position detecting apparatus may be operative to effect an emergency power shutdown of a robot if a human being enters the robot's work area. Also, the apparatus may serve as a back-up system in detecting the robot's own position in case the robot becomes "confused" and does not know where it is.

SUMMARY OF THE INVENTION

It is an object of the present invention to provide a position detection apparatus of the type described above which is simple to fabricate and easy to retrofit into an existing viewing field.

It is a further object of the present invention to provide a position detection apparatus of the type described above which may be used for both a small viewing field, such as a computer display screen, and a relatively large viewing field, such as a room in a building.

These objects, as well as other objects which will become apparent from the discussion that follows, are achieved, according to the present invention, by providing at least one, and preferably two or more radiation receivers at spaced locations around the perimeter of the viewing field. A substantially point source of radiation is disposed at each location on the perimeter and arranged to illuminate the viewing field with radiation. A retro-reflective surface is disposed around the perimeter and arranged to reflect radiation received from an originating source back toward the originating source.

The apparatus according to the invention thus operates in a manner similar to the apparatus disclosed in the U.S. Pat. No. 4,144,449 with the distinction that the radiation originates from point sources rather than from elongate (linear) sources which extend around the perimeter of the viewing field. Radiation produced by each point source, which may be an LED for example, is passed across the viewing field and is then reflected back toward the point source by the retro-reflective surface. This reflected radiation is then received and sensed by the detector, arranged adjacent to the point source, unless, of course, the radiation was interrupted by an object positioned in the viewing field.

The retro-reflective surface may, for example, be formed of "retro-reflective tape" which is readily commercially available for use as roadside reflectors and the like. The surface of this tape is formed by a layer of tiny transparent spheres, for example of glass. This tape is relatively inexpensive and may be easily attached to the walls or sides of the viewing field. The viewing field may thus be relatively small, as in the case of a computer display screen, or relatively large, such as a room in a building.

The apparatus according to the invention may further include an electronic circuit, coupled to the radiation receivers, for determining the coordinates of an object located within the viewing field. For example, the viewing field may be substantially rectangular and the electrical circuit may produce signals indicative of the X and Y coordinates of an object within the viewing field.

The radiation employed with the present invention is preferably light radiation; however, if ambient light would interfere with the operation of the position detection apparatus, radiation at other, non-light frequencies, such as infrared radiation, may also be used.

Whereas two radiation receivers located at adjacent corners of a rectangular viewing field would normally be sufficient, enhanced resolution may be provided by arranging three or more receivers around the perimeter of the viewing field. In this way, an object within the viewing field may be viewed from a distance by at least two receivers.

The electrical circuit for determining the coordinates of an object located within the viewing field may indicate the position of the object in two dimensions (X,Y coordinates) or in three dimensions (X,Y,Z coordinates). The determination of three dimensions has the advantage that objects entering the viewing field in the Z direction (such as a finger pointing toward a computer display screen) may be recognized only when their Z coordinate position moves past a threshold.

Furthermore, the electrical circuit may be operative to indicate the position of only those objects which exceed a certain size. Thus, noise and uninterestingly small objects can be ignored.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

The preferred embodiments of the present invention will now be described with reference to FIGS. 1–10 of the drawings. Identical elements in the various figures are designated with the same reference numerals.

Figure 1:
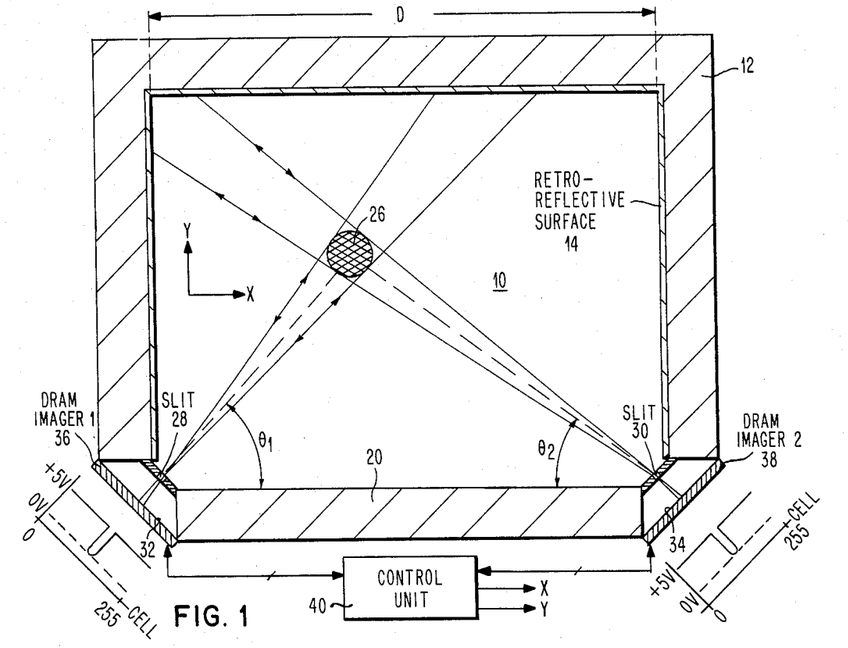
FIG. 1 is a plan view of the position detecting apparatus according to a preferred embodiment of the present invention.

FIG. 1 is a plan view of a computer display screen having a screen area or viewing field 10 surrounded by a raised frame or border 12. The inner surface of the border 12, which is substantially perpendicular to the viewing surface of the display screen 10 is provided with a retro-reflective coating 14. This coating 14 provides a "retro-reflective" surface around the perimeter of the viewing field; that is, a surface which reflects radiation from an originating radiation source back toward the originating source.

The composition of the retro-reflective coating 14, which is discussed in detail hereinbelow, may be applied directly to the frame 12 or it may be manufactured first in the form of an adhesive tape which is subsequently applied to the inner surface of the frame 12. Suitable retro-reflective tape is readily available commercially. One such tape may be obtained, for example, from Spartan Plastics, Inc., P.O. Box 67, Holt, Mich., 48842.

Figures 2, 3:
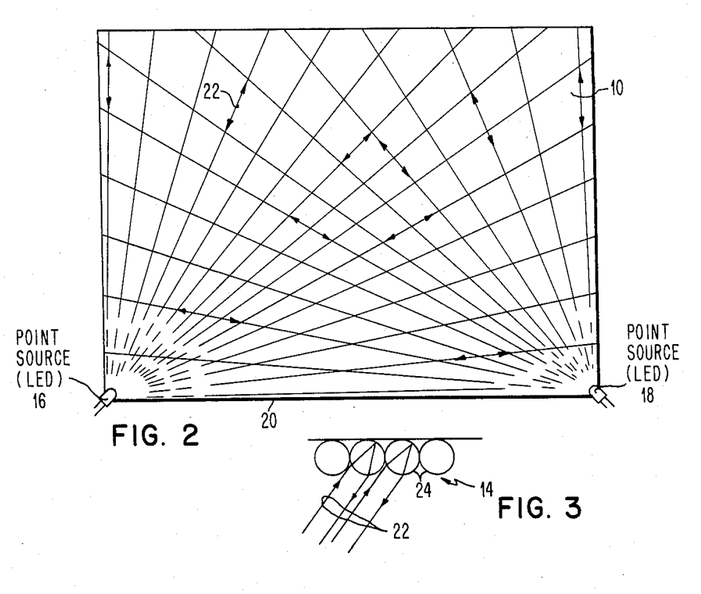
FIG. 2 is a diagramatic view illustrating the opertion of the apparatus of FIG. 1.
FIG. 3 is a diagramatic view illustrating the operation of the retro-reflective surface utilized in the present invention.

The position detecting apparatus shown in FIG. 1 is further provided with two substantially point sources of radiation. For purposes of clarity, these sources are not illustrated in FIG. 1. They are shown, however, in FIG. 2, which indicates their location with respect to the viewing field 10. As shown in FIG. 2, a first source 16 is disposed at one corner of the viewing field 10 and the second source 18 is disposed at another, second corner which has a common side 20 with the first corner. The side 20 of the viewing field need not be provided with a retro-reflective coating, as may be seen in FIG. 1.

Returning to FIG. 2, the point sources of radiation both illuminate the entire viewing field with radiation (e.g. light) which extends in a direction parallel to the plane of the viewing field 10. The retro-reflective surface around the perimeter of the viewing field reflects the radiation back toward the respective originating sources as is indicated by the arrows within the viewing field. Thus, for example, a ray 22 originating from the LED 16 extends outward to the side of the display screen and then returns to the LED 16.

FIG. 3 shows how the ray 22 is reflected backward toward its source by the retro-reflective coating 14. As is shown in FIG. 3, this coating 14 comprises a plurality of small, transparent spheres 24 which act as tiny lenses and mirrors that reflect the incoming ray and insure that the angle of exit is the same (or approximately the same) as the angle of incidence.

Figure 4:
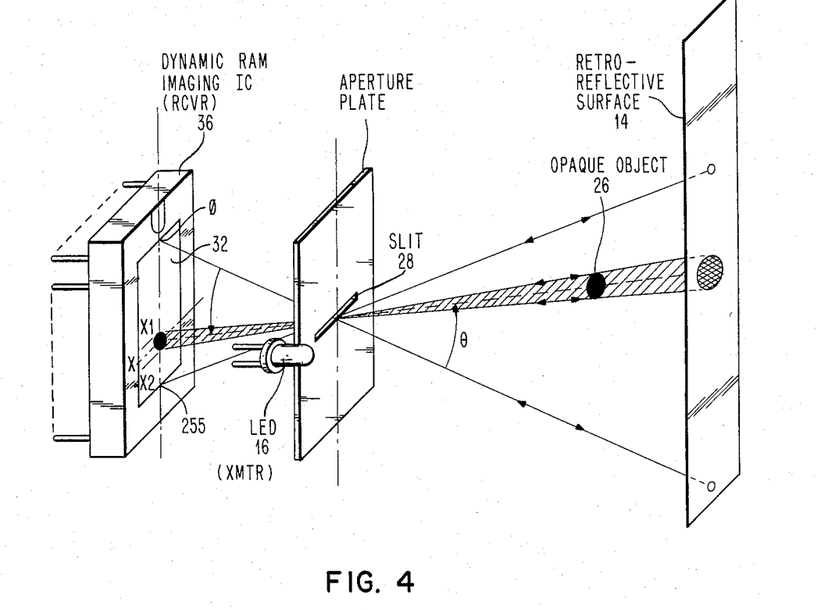
FIG. 4 is a perspective view (not to scale) illustrating the optical system employed in the apparatus of FIG. 1.
Figure 5:
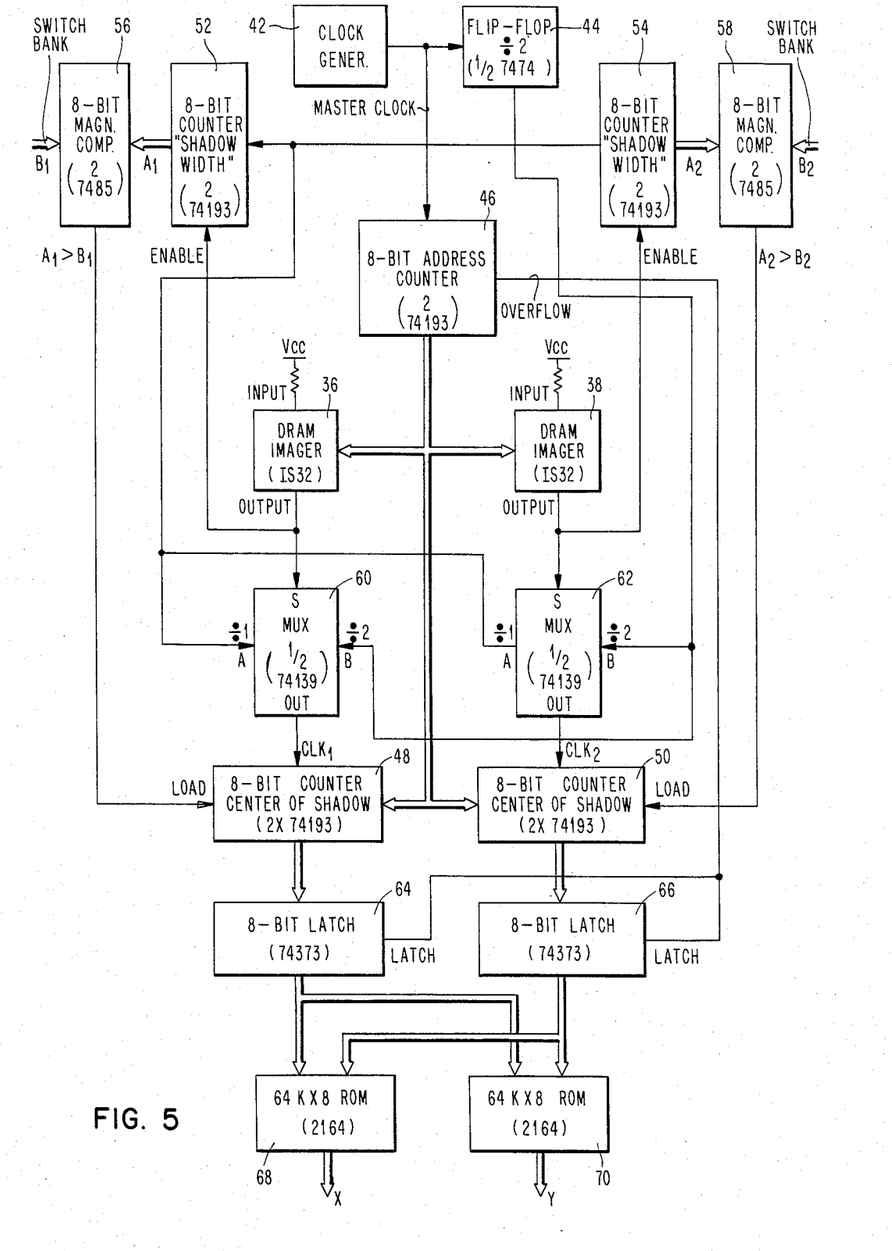
FIG. 5 is a block diagram of the electronic control circuit employed in the apparatus of FIG. 1.

FIG. 1 illustrates how the position detecting apparatus according to the invention operates to detect the existence and location of an object 26 within the borders of the frame 12. Assuming that radiation (e.g. light) originates from point sources (e.g., LED's) at the lower left and lower right corner of the viewing field ("lower left" and "lower right" being defined as shown in the diagram of FIG. 1) in the manner illustrated in FIG. 2, this light traverses outward and is reflected back into a slit 28 in the lower left corner and a slit 30 in the lower right corner of the viewing field 10. The slits 28 and 30 serve as optical apertures to image individual rays on the sensing surfaces 32 and 34 of dynamic RAM imaging IC's 36 and 38, respectively. The dynamic RAMs are interrogated by an electronic control unit 40 that produces output signals indicative of the X,Y coordinate position of the object 26. The operation of the position detecting apparatus is best understood with reference to FIGS. 4 and 5 of the drawings. FIG. 4 illustrates a particular imaging system wherein the radiation is light (produced by an LED), and FIG. 5 is a block diagram illustrating the operation of the control unit 40. As may be seen in FIG. 4, light emitted from the LED 16 is reflected back to this source by the retro-reflective surface 14. This light passes through a slit 28 to the surface 32 of a dynamic RAM imager 36. On the surface 32, the light discharges a light-sensitive capacitor, thus generating a logical 0 in the memory, at each of the memory locations receiving light. If an opaque object, such as a pencil or a human finger, enters the viewing field, a shadow is cast on the imager permitting the capacitors within the shaded area to retain their charge. The imager thus generates a logical 1 as an output from each of those memory cells within the shaded area.

The dynamic RAM may, for example, have 256 cells (0–255) arranged linearly along its sensing surface. Letting X represent the linear position along the dynamic RAM of the shadow of the opaque object 26 on the sensing surface 32, then X is proportional to the angle that the opaque object forms through the slit with the 0th cell. Assuming that the opposite sides of the shadow fall at positions X1 and X2 (where $0 \leq X1 \leq X2 \leq 255$) then the mean value X or center of the shadow will be at position $(X1+X2)/2$.

If a combination of two light source and dynamic RAM assemblies are provided as are illustrated in FIGS. 1 and 2, then the X,Y position of the object 26 may be determined by "triangulation". In this case, two angles $\theta 1$ and $\theta 2$ are measured and the X,Y coordinates are calculated from the values of these two angles plus the distance "D" between the two points of measurement.

FIG. 5, illustrates a hard wired version of an electronic control unit 40 for determining the X,Y coordinates from the information received from the dynamic RAMs. This device uses a table look up method for finding these coordintes. The device comprises a clock generator 42 which sends clock pulses to a divide-by-2-circuit (flip flop) 44 and an 8 bit address counter 46. The output of the address counter 46 is passed to both dynamic RAMs 36 and 38 as well as to two further 8 bit counters 48 and 50. Pulses from the clock generator 42 are also supplied to two 8 bit counters 52 and 54 which produce outputs A1 and A2, respectively. These outputs are passed to two 8 bit magnitude comparators 56 and 58, respectively, which compare the numbers A1 and A2 with the numbers B1 and B2, respectively. These numbers B1 and B2 may be supplied to the control unit from a toggle switch bank or from a computer.

Clock pulses from the clock generator 42 as well as from the divider circuit 44 are supplied to two multiplexors 60 and 62, respectively. These multiplexors also receive inputs from the dynamic RAMs 36 and 38, respectively, and supply outputs to the counters 48 and 50, respectively. The outputs from the dynamic RAMs 36 and 38 are also supplied to the counters 52 and 54, respectively.

The contents of the 8-bit counters 48 and 50 are latched into 8-bit latches 64 and 66, respectively, upon receipt of an overflow pulse from the 8-bit address counter 46. The contents of the two latches 64 and 66 are used to address two 64K×8 ROMs 68 and 70.

The circuit of FIG. 5 operates to consecutively address the memory cells of the dynamic RAMs 36 and 38. The outputs of these cells (logical 0 for cells which receive light and logical 1 for cells which do not) are passed to the 8-bit counters 48 and 50 in the following manner: each cell with a logical 0 is counted by passing clock pulses from the input A of each multiplexor to the clock input of the respective counter 48 or 50. Every other memory cell with a logical 1 is counted by passing the half-speed clock pulses from the input B of each multiplexor to the clock input of the respective counter 48 or 50. The counters 48 and 50 are reset to 0 each time the first cell (cell 0) of each dynamic RAM 36 and 38 is addressed. The contents of the counters 48 and 50 are frozen by signals received at their "load" inputs from the magnitude comparators 56 and 58, respectively. These contents are then latched into the latches 64 and 66, respectively, when the 8-bit address counter 46 reaches the address number 255.

The counters 52 and 54 and the comparators 56 and 58 serve to eliminate those shadows which do not exceed a minimum width. The numbers A1 and A2, representing the widths of the shadows appearing on the RAMS 36 and 38, respectively, are compared with fixed numbers B1 and B2, respectively, which, for example, may be in the range of 30–50 (the pixel width) of objects to be "seen" by the RAMs 36 and 38. If shadows have a width (in numbers of memory cells) which is less than this value (B1 or B2) they will be ignored.

Consequently, the counters 48 and 50 each produce a count X which represents the position (in pixels) of the center of the object. Letting X1 be the lower memory cell address of one side of the shadow and X2 the higher memory cell address of the opposite side of the shadow (see FIG. 4), then this count x will be determined by the formula:

$$X = X1 + \tfrac{1}{2}(X2 - X1).$$

The counters 48 and 50 initially count the numbers X1 at the original clock rate and then count the number $\tfrac{1}{2}(X2-X1)$ at one half the original clock rate.

The ROMs 68 and 70 contain the coordinates X and Y, respectively, associated with the respective inputs for these coordinates. The coordinate values are best determined by manual calibration of the system. With the system in operation, an object is placed within the viewing field at known coordinates X and Y. These coordinates are then inserted in the respective ROMs 68 and 70 at the addresses produced by the system. By using a mechanical plotter, this calibration may be performed automatically for all addresses.

Figure 6:
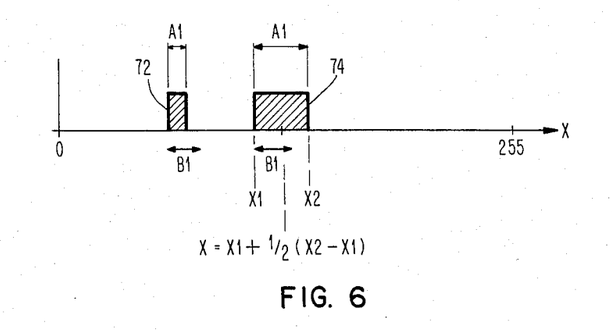
FIG. 6 is a single-coordinate diagram illustrating the filtering feature of the circuit of FIG. 5.

FIG. 6 illustrates the operation of the shadow filtering system of FIG. 5. As shown, the control unit detects a first shadow 72 with a width A1 less than the minimum width B1. This shadow is ignored. The system then encounters a second shadow 74, having a width A1 greater than the minimum width B1. In this case, the system determines the address of the center point X=X1+½ (X2−X1) and this address is passed to the ROM 68 to find the coordinate X by table look-up.

Figure 7:
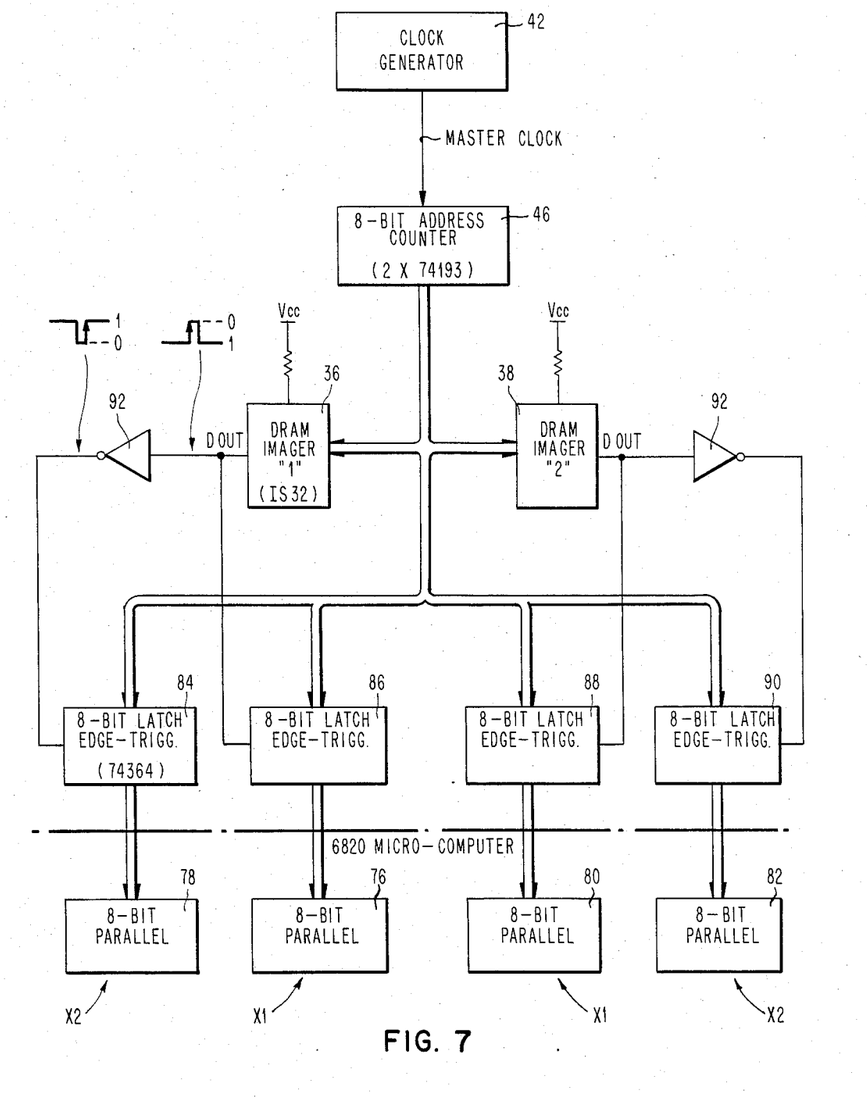
FIG. 7 is a block diagram showing an alternative embodiment of the electrical control circuit employed in the apparatus of FIG. 1.

FIG. 7 shows an alternative embodiment of the control unit 40 of the position detecting apparatus. In this control unit, the X and Y coordinates are determined by a microprocessor operating with suitable software. The lower address (X1) of a shadow on one dynamic RAM 36 is passed to a first 8 bit parallel I/O port 76. The higher address (X2) of the shadow is passed to a second I/O port 78. Similarly, the lower address (X1) of a shadow formed on the other dynamic RAM 38 is passed to an I/O port 80, whereas the higher address (X2) of the shadow is passed to the I/O port 82. The lower and higher addresses are selected by triggering 8 bit latches 84, 86, 88 and 90 with the rising edges of pulses. When a shadow is seen by a dynamic RAM, the RAM output goes from low to high; inverters 92 are used to produce pulses with leading edges going from low to high upon a transition from a shadow to a light area.

Figure 8:
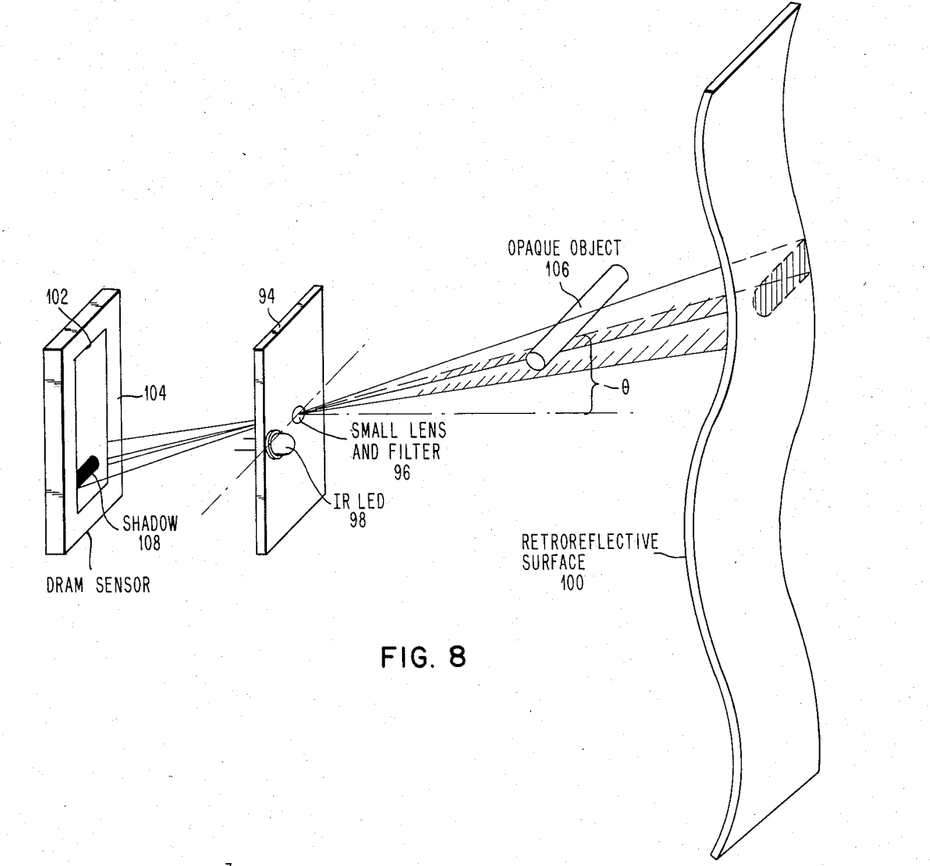
FIG. 8 is a perspective view illustrating an alternative embodiment of the optical system utilized in the apparatus of FIG. 1.
Figure 9:
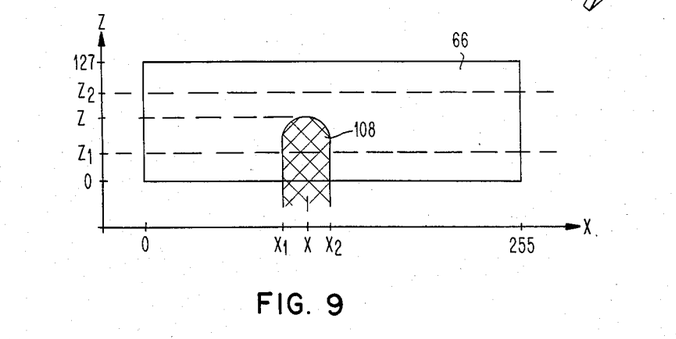
FIG. 9 is a two-coordinate diagram illustrating the operation of the dynamic RAM imaging IC in the embodiment shown in FIG. 8.

FIG. 8 illustrates an alternative embodiment wherein the array of 128×256 cells in a dynamic RAM are all utilized to determine a second, Z dimension of the shadow produced by an opaque object. In this case, the aperture plate 94 contains a small lens 96 rather than a slit. The infrared radiation produced by the source 98 (LED) is reflected back from the retro-reflective surface 100 through the lens 96 to the sensing surface 102 of the dynamic RAM 104. An opaque object 106, such as a finger, forms a shadow 108 on the surface 102. The existence and location of this shadow, indicated schematically in FIG. 9, may be determined by addressing the cells of the RAM 104.

The control circuit for addressing the cells of RAM 104 may be similiar to that shown in FIG. 7. In this case, a 16-bit address counter may be used in place of the 8-bit address counter 46 to address the 128×256 cells in each RAM. The microcomputer memory must also be correspondingly larger to provide storage for the additional, third coordinate. The microprocessor software takes care of implementing the functions described above in connection with FIG. 5.

It is also possible to arrange a radiation source and a dynamic RAM at each of the four corners of the viewing field. In this case, the retro-reflective surface should be disposed around the entire perimeter of the viewing field. This arrangement has two principal advantages:

(1) An opaque object in a viewing field located near a RAM is "seen" by this RAM as an extremely large shadow. It is preferable if such large shadows are ignored (in the same way that extremely small shadows are ignored) and that the determination of the coordinates of the object position made from shadows of intermediate size.

(2) If the viewing field has an unusual shape or contains opaque obstructions within its borders, the four RAMs provide additional points from which to "view" the viewing field, so as to cover the entire viewing area.

Figure 10:
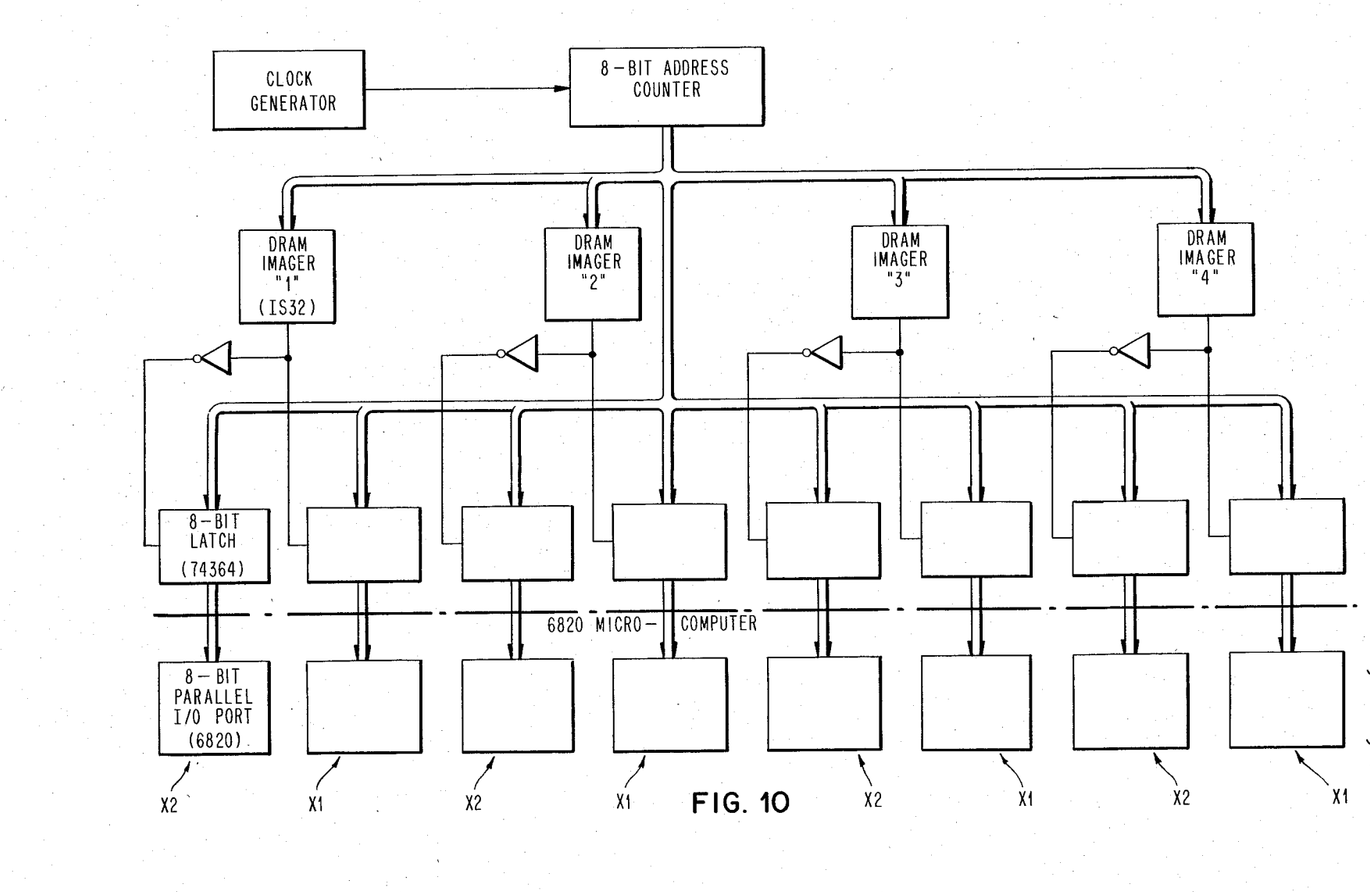
FIG. 10 is a block diagram showing still another alternative embodiment of the electronic control circuit employed in the apparatus of FIG. 1.

FIG. 10 illustrates a control circuit suitable for addressing four dynamic RAMs in parallel. The locations of the shadow edges (cells X1 and X2) are repeatedly stored in 8-bit latches and presented to the respective 8-bit parallel I/O ports of a microprocessor.

There has thus been shown and described a novel position detecting apparatus which fulfills all the objects and advantages sought therefor. Many changes, modifications, variations and other uses and applications of the subject will, however, become apparent to those skilled in the art after considering this specification and the accompanying drawings which disclose preferred embodiments thereof. All changes, modifications, variations and other uses and applications which do not depart from the spirit and scope of the invention are deemed to be covered by the invention which is limited only by the claims which follow.

What is claimed is:

1. Apparatus for detecting the position of an object within a viewing field, said apparatus comprising, in combination:
   (a) a first, substantially point source of radiation disposed at a first location on the perimeter of said viewing field and arranged to illuminate said viewing field with radiation;
   (b) a retro-reflective surface disposed around said perimeter and arranged to reflect radiation received from an originating source back toward said originating source; and
   (c) first means, disposed on said perimeter adjacent to said first source, for receiving the radiation reflected by said retro-reflective surface and for sensing a first direction at which radiation originating from said first source is interrupted by an object located within said viewing field.

2. The apparatus defined in claim 1, further comprising:
   (d) a second, substantially point source of radiation disposed at a second location on said perimeter and arranged to illuminate said viewing field with radiation; and
   (e) second means, disposed on said perimeter adjacent to said second source, for receiving the radiation reflected by said retro-reflective surface and for sensing a second direction at which radiation originating from said second source is interrupted by an object located within said viewing field.

3. The apparatus defined in claim 2, further comprising:
   (f) electrical means, responsive to said first and second means, for determining the coordinates of an object located within the viewing field from said first and second directions.

4. The apparatus defined in claim 2, wherein said first and second directions are each defined by the magnitude of a single coordinate parameter.

5. The apparatus defined in claim 4, wherein said coordinate parameter is the angular position with respect to the axis of viewing of said first and said second means, respectively.

6. The apparatus defined in claim 2, wherein said first and second sources emit light radiation.

7. The apparatus defined in claim 2, wherein said first and second sources emit infrared radiation.

8. The apparatus defined in claim 1, wherein said viewing field is a computer display screen.

9. The apparatus defined in claim 1, wherein said viewing field is at least a portion of a room.

10. The apparatus defined in claim 3, wherein said viewing field is substantially rectangular.

11. The apparatus defined in claim 10, wherein said coordinates are rectangular (X,Y) coordinates.

12. The apparatus defined in claim 10, wherein said first and second means are respectively disposed in two adjacent corners of said rectangular viewing field.

13. The apparatus defined in claim 12, further comprising:
(g) a third, substantially point source of radiation disposed at a third corner of said rectangular viewing field and arranged to illuminate said viewing field with radiation;
(h) third means, disposed on said perimeter adjacent to said third source, for receiving the radiation reflected by said retro-reflective surface and for sensing a third direction at which radiation originating from said second source is interrupted by an object located within said viewing field;
wherein said electrical means is further connected and responsive to said third means for calculating said coordinates.

14. The apparatus defined in claim 13, further comprising:
(i) a fourth, substantially point source of radiation disposed at a fourth corner of said rectangular viewing field and arranged to illuminate said viewing field with radiation;
(j) fourth means, disposed on said parimeter adjacent to said fourth source for receiving the radiation reflected by said retro-reflective surface and for sensing a fourth direction at which radiation originating from said fourth source is interrupted by an object located within the viewing field;
wherein said electrical means is further responsive to said fourth means for calculating said coordinates.

15. The apparatus defined in claim 12, wherein said retro-reflective surface is disposed around three sides of said rectangular viewing field, said retro-reflective surface being omitted on the side bridging said two adjacent corners.

16. The apparatus defined in claim 14, wherein said retro-reflective surface is disposed around all four sides of said rectangular viewing field.

17. The apparatus defined in claim 3, wherein said electrical means determines the X,Y coordinates of an object located on a two-dimensional plane within the viewing field.

18. The apparatus defined in claim 3, wherein said first and second directions are each defined by two orthogonal coordinates, and wherein said electrical means determines the three dimensional position of an object located within the viewing field.

19. The apparatus defined in claim 18, wherein said electrical means determines the orthogonal coordinates defining said three dimensional position.

20. The apparatus defined in claim 3, wherein said electrical means determines the coordinates of the approximate center of an object located within the viewing field.

21. The apparatus defined in claim 3, wherein said electrical means determines the coordinates of an object located within the viewing field, only when the silhouette of said object, as viewed by said first and said second means, exceeds a prescribed size.

* * * * *